(12) United States Patent
Castillo

(10) Patent No.: US 7,421,024 B2
(45) Date of Patent: Sep. 2, 2008

(54) METHOD FOR TRANSCODING MPEG ENCODED STREAMS

(75) Inventor: Michael J. Castillo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 10/611,452

(22) Filed: Jun. 30, 2003

(65) Prior Publication Data

US 2004/0264803 A1 Dec. 30, 2004

(51) Int. Cl.
*H04N 7/12* (2006.01)
*H03M 7/00* (2006.01)

(52) U.S. Cl. .................. 375/240.18; 341/61

(58) Field of Classification Search ............ 375/240, 375/240.12, 240.01, 240.25, 240.18, 240.26; 382/243, 250; 725/100; 341/61
See application file for complete search history.

(56) References Cited

U.S. PATENT DOCUMENTS

| 6,052,415 | A * | 4/2000 | Carr et al. ............... 375/240.12 |
| 6,993,201 | B1 * | 1/2006 | Haskell et al. ............... 382/243 |
| 7,039,116 | B1 * | 5/2006 | Zhang et al. ............ 375/240.26 |
| 2001/0013131 | A1 * | 8/2001 | Wang .......................... 725/100 |
| 2002/0126752 | A1 | 9/2002 | Kim |
| 2002/0181579 | A1 * | 12/2002 | Vetro et al. .................. 375/240 |
| 2003/0041257 | A1 | 2/2003 | Wee et al. |
| 2003/0152282 | A1 * | 8/2003 | Trenary et al. .............. 382/250 |
| 2003/0161401 | A1 * | 8/2003 | Shen et al. ............. 375/240.16 |

FOREIGN PATENT DOCUMENTS

| WO | WO 01/47248 | 6/2001 |
| WO | WO 03/061291 | 7/2003 |

OTHER PUBLICATIONS

Rakesh Mohan, et al., *Adapting Multimedia Internet Content for Universal Access*, Mar. 1999, pp. 104-114, vol. 1, No. 1, IEEE Transactions on Multimedia.

* cited by examiner

*Primary Examiner*—Don N Vo
(74) *Attorney, Agent, or Firm*—Blakely, Sokoloff, Taylor & Zafman LLP

(57) ABSTRACT

A system and method of transcoding video data for distribution over a variety of media. A digital data stream is decoded and optionals down sampled to reduce the bit rate of the original stream. The decoded stream is further encoded to further reduce the bit rate of the data stream to be consistent with the reliable delivery capabilities of the media over which the data stream is to be transmitted and/or the display on which display is to occur.

30 Claims, 2 Drawing Sheets

METHOD FOR TRANSCODING MPEG ENCODED STREAMS

BACKGROUND

1. Field

Embodiments of the invention relate to data transmission. More specifically, embodiments of the invention relate to distribution of video content over alternative transmission media.

2. Background

Traditionally, television content providers provide programming as an analog data stream received by a tuner, which then converts the analog stream into a digital format for storage for later viewing and/or current presentation on a display driven by the digital data. Increasingly, television content providers, such as cable and satellite companies, are providing digital programming directly to the users. Digital programs may be delivered over a variety of physical media including cable, through the airwaves by radio waves or over copper telephone lines. The digital programs are typically compressed to increase the amount of programming the content the provider can transmit.

The compressed digital programming is received by the user's television or receiver, which might be a set top box. The digital programming must be decompressed prior to formatting it for display. The proliferation of high definition (HD) programming which may require bit rates as high as twenty-five megabits per second (Mb/s) for the digital content stream. For an environment in which the display device is connected to the receiver by relatively low bandwidth network, this bit rate may not be possible to reliably transmit to the display. Additionally, storage of such a bit rate stream on a non-volatile mass storage medium such as a hard drive can be unduly burdensome on over all system storage resources.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The creation of a new paradigm in which a single receiver device, such as a set top box, acts as a media server for a home by sending and receiving digital programming to a plurality of devices in the home makes transcoding of an incoming video data stream to reduce the bit rate desirable to permit reliable delivery to multiple devices. Constraints on the bit rate may be imposed by the transport medium, the receiving display and/or the available storage resources. The digital video stream may be sourced by a content provider such as a cable or satellite operator or, e.g., from a digital versatile disc (DVD) player local to the receiver device. In some cases, the digital stream provided by these sources may be at high definition (HD) rates, which may not be supported by all transport media and or displays associated with the receiver device.

Figure 1:
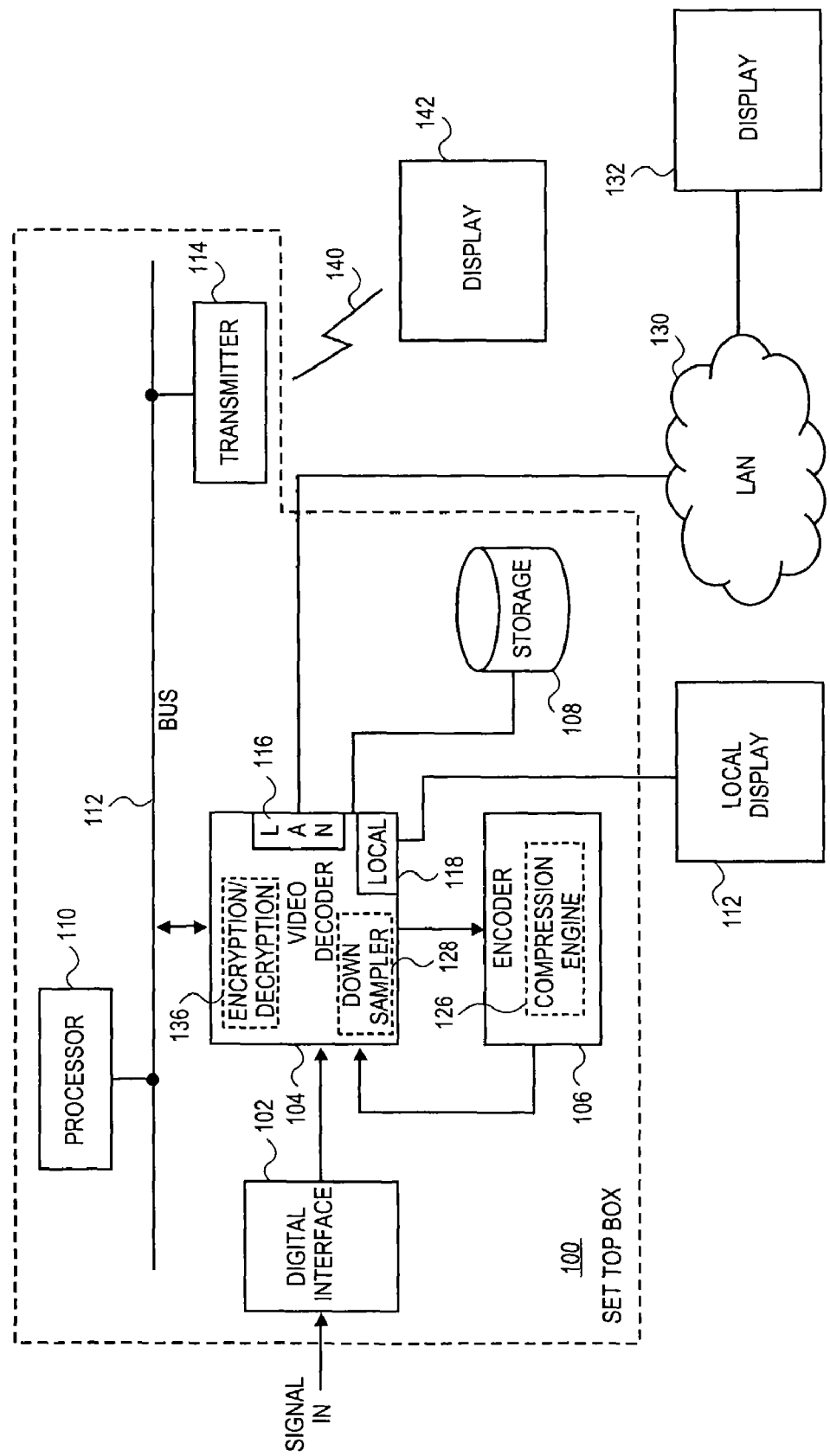
FIG. 1 is a block diagram of the system of one embodiment of the invention.

FIG. 1 is a block diagram of the system of one embodiment of the invention. Set top box 100 may be employed to receive, for example, a video signal from a cable or satellite operator. The incoming or source data stream arrives directly or indirectly at digital interface 102. In the event that the original signal provided by, e.g., the cable operator, is in an analog form, it may first be sampled and encoded in a digital form before being provided to digital interface 102. Alternatively, as noted above, many content providers are providing digital content directly to their subscribers or the source stream may come from a connected DVD player. In this event, the digital data stream would be provided directly to digital interface 102.

Digital interface 102 provides the digital video data stream to video decoder 104. The video decoder 104 receives the source video data stream and decodes it. This decoding may take the form of decryption using an encryption/decryption engine 136 and/or other decompression. For example, where the incoming stream is a Motion Pictures Expert Group (MPEG) encoded stream. For example, MPEG-2 Generic Coding of Moving Pictures and Associated Audio Information ISO/IEC JTC1/SC29/WG11 N MPEG 00/October 2000 (MPEG-2) and MPEG-4 Coding of Moving Pictures and Audio ISO/IEC JTC1/SC29/WG11 N4668 March 2002 "(MPEG-4)" are examples of well-known video encoding standards (generically MPEG encoding or MPEG standard). Decompression consistent with the appropriate MPEG standard is required. The decoded signal may then be stored in a non-volatile storage unit 108, which may, in one embodiment, be a hard drive. Other suitable non-volatile storage media include, without limitation, flash memory or other solid state memory device. Alternatively, the video stream may be distributed by video encoder to display 122 by a local interface 118. In one embodiment, local display 122 and local interface 118 have sufficient bandwidth and resolution to handle a high definition video stream.

A high definition video stream may have a bit rate on the order of 25 Mb/s. When the incoming stream is a high definition stream, interfaces other than the local interface 118 may have insufficient bandwidth to reliably handle the video stream. Alternatively, the display resolution of a target display may not utilize the full bit rate of the source stream. Additionally, significant storage resources would need to be devoted to a high definition stream to store in non-volatile storage 108. Thus, in one embodiment, when the incoming data stream exceeds the reliable bandwidth of one or more interfaces over which the video stream may be distributed, the decoded video stream may be down sampled by down sampler 128 before being passed to encoder 106.

In one embodiment, the interface between the video decoder 104 and the encoder 106 adheres to ITU-R BT.656-4 Interfaces for Digital Component Video Signals in 525-Line and 625-Line Television System Operating at the 4:2:2 Level of Recommendation ITU-R BT.601, Published February 1998 the ("656 Standard"). A 656 Standard interface provides insufficient bandwidth for a HD stream. In such an embodiment, an HD stream is necessarily down sampled prior to passing the decoded stream to the encoder 106. The aggressiveness of the down sampling may also be dynamically adjusted based on constraints imposed by the expected transport media, storage resources and/or target display. To accomplish this, the video encoder may include a look up table (LUT) or other logic to map the constraints to a desired rate of down sampling. Additionally, it is contemplated that embodiments exist in which the entire desired reduction in bit rate may be accomplished by the encoder without any down sampling by the video encoder 104.

In one embodiment, encoder 106 includes a compression module which may, for example, perform MPEG encoding on the decoded video stream to generate a lower bit rate video stream that can be reliably handled by the desired interface, more efficiently use storage resources or satisfy limitations of target display resolutions. In one embodiment, the encoder 106 is an MPEG-2 encoder. In an alternative embodiment, an MPEG-4 encoder may be used.

While a high definition stream is a good example where down sampling and/or aggressive compression may be used, it should be recognized that even lower bit rate signals may be down sampled and/or encoded. For example, where the target display is a personal digital assistant (PDA) screen resolution is overmatched even by a standard definition (SD) video signal. Thus, network bandwidth and storage resources may be more efficiently used by reducing the bit rate of a SD video signal in this context. In one embodiment, encoder 106 may include logic to dynamically adjust the aggressiveness of the compression based on the current available bandwidth of the expected transport media. In another embodiment, a user may be permitted to select a desired bit rate to allow longer record times by reducing the non-volatile storage required for each unit of time of the video stream.

The lower bit rate video stream is passed back to the video decoder 104 which may encrypt the stream using the encryption/decryption engine 136. The lower bit rate stream may either be stored in non-volatile storage unit 108 or passed through, for example, local area network (LAN) interface 116 over LAN 130 to display 132. Alternatively, the stream may be placed on bus 112 under control of processor 110 and sent via transmitter 114 using RF signaling 140 to display 142. In one embodiment, encryption/decryption engine 136 employs public key encryption and transmitter 114 decrypts a data stream prior to transmitting it to display 142. In one embodiment, transmitter 114 performs wireless signaling in compliance with IEEE 802.11 standard, IEEE 802.11, 1999 Edition entitled, IEEE Standards for Information Technology—Telecommunications and Information Exchange between Systems—Local and Metropolitan Area Network—Specific Requirements—Part 11; Wireless LAN Medium Access Control (MAC) and Physical Layer (PHY) Specifications, or its progeny (the 802.11 Standard). In one embodiment, bus 112 is a peripheral component interconnect (PCI) bus. As used herein, a "local" display is proximate to the set top box typically coupled thereto by a dedicated interface (here local interface 118). A "remote" display is coupled to the set top box 100 over a network or a shared interface.

In one embodiment, processor 110 is a general purpose processor such as the Pentium® 4 available from Intel Corporation in Santa Clara, Calif. In another embodiment, a general purpose microprocessor, such as microprocessor 110, is used to replace the functionality of video decoder 104 and encoder 106. Thus, the general purpose processor under the control of software performs the same functionality attributed to the video decoder 104 and encoder 106 above. The software may be an embodiment in any computer readable media including, without limitation, magnetic or optical media, flash memory, random access memory, or any other media in which computer readable instructions are commonly stored.

Figure 2:
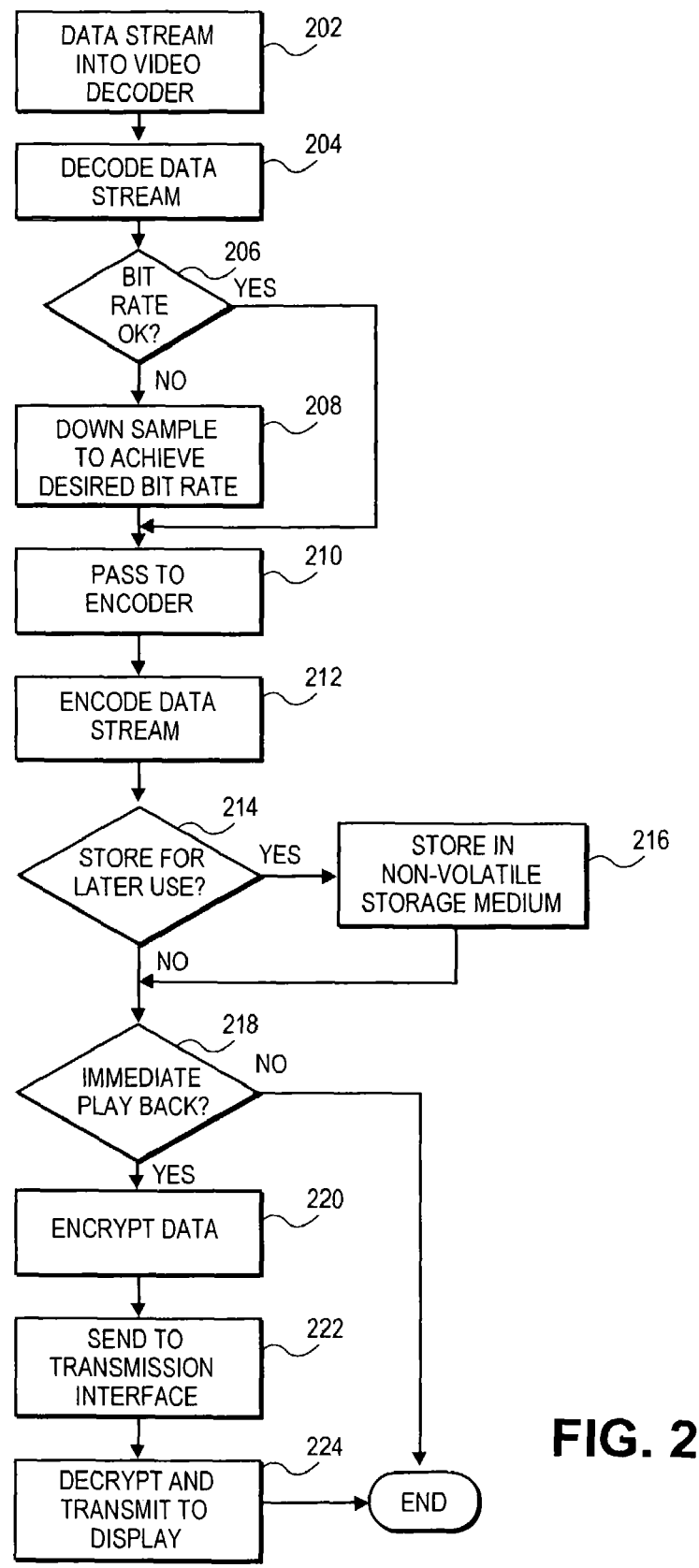
FIG. 2 is a flow diagram of operation of a system of one embodiment of the invention.

FIG. 2 is a flow diagram of operation of a system of one embodiment of the invention. At block 202, the data stream is received into the video decoder. At block 204, the data stream is decoded. A determination is made at decision block 206, if the bit rate of the decoded data stream is sufficiently low to be reliably transmitted over a desired interface, and/or satisfies display or storage constraints. In one embodiment, this may include the interface between the video decoder and the encoder. If the bit rate is too high for a desired interface, the data stream may be down sampled to achieve a lower bit rate at block 208. This may take the form of reducing the bit rate of a high definition video stream down to standard definition bit rates. Down sampling necessarily results in a reduction of resolution obtainable from the video stream, but where the target display does not support a higher resolution, no loss occurs from a user perspective. Moreover, when a transport media is over utilized, data from the stream is often dropped resulting in glitches or interruptions in the viewed video stream. Accordingly, reducing the bit rate often results in a higher quality viewing experience where transport is otherwise constrained. In some embodiments, if the interface between the video decoder and the encoder can handle the full bit rate of the source data stream, no down sampling may occur and responsibility for bit rate reduction is placed solely on the encoder.

If the bit rate is okay at decision block 206 or after down sampling, the data stream is passed to the encoder at block 210. The encoder encodes the data stream at block 212. Encoding may take the form of compression. In one embodiment, the encoder compresses the data stream into MPEG 2 or MPEG 4 format. The data stream relative aggressiveness of the compression may be used to achieve a further reduced bit rate data stream. In one embodiment, the aggressiveness of the compression is dynamically adjusted in real time based on a then current load on the transport medium. A decision is made at decision block 214 whether an encoded stream should be stored for later use. It is desired to store for various use, for example, where the video stream is being recorded for future playback, it may be stored in a non-volatile storage medium such as a hard drive at block 216.

After storage or if no storage is desired, a decision is made at block 218 if immediate playback is desired. If immediate playback is desired, the data stream may be encrypted at block 220. An encrypted data stream may then be sent to a transmission interface at block 222. This may include sending the data stream to a wireless signaling interface or, for example, sending out via a LAN interface. The data stream is then decrypted and transmitted to a target display at block 224. The decryption may occur prior to transmission, such as in the case of the wireless signaling interface described in connection with FIG. 1 or at the display, such as when the context is transmitted over a LAN as also described with reference to FIG. 1 above.

In the foregoing specification, the invention has been described with reference to specific embodiments thereof. It will, however, be evident that various modifications and changes can be made thereto without departing from the broader spirit and scope of the disclosure as set forth in the appended claims. The specification and drawings are, accordingly, to be regarded in an illustrative rather than a restrictive sense.

The invention claimed is:

1. A method comprising:
    decoding a digital data stream received at a video decoder into data including decompressed video data;
    passing a decoded data stream to an encoder;
    dynamically adjusting an aggressiveness of down sampling of the data stream prior to passing the data stream, wherein down sampling is based at least on constraints imposed by storage resources; and
    encoding the decoded data stream at a bit rate below a bit rate of the digital data stream to form a lower bit rate data stream.

2. The method of claim 1 further comprising:
    storing data corresponding to the lower bit rate data stream in a non-volatile storage medium.

3. The method of claim 1 further comprising:
    encrypting the lower bit rate data stream; and
    busing the encrypted lower bit rate data stream to a distribution interface.

4. The method of claim 1 comprising:
sending the digital data stream to a display device if the display device is local to the video decoder; and
sending the lower bit rate data stream to a display device if the display device is remote from the video decoder.

5. The method of claim 1 further comprising:
wirelessly transmitting the lower bit rate data stream to a display device.

6. The method of claim 1 wherein the encoding comprises:
compressing the decoded data stream.

7. The method of claim 1 wherein the dynamic adjustment of down sampling is accomplished including by a look up table.

8. The method of claim 7 wherein look-up is based at least on constraints imposed by expected transport media, storage resources, or target display.

9. The method of claim 1 wherein the down sampling comprises down sampling based at least on a desired bit rate to allow longer recording times by reducing a non-volatile storage required for each unit of time of the down sampled data stream.

10. The method of claim 9 wherein encoding comprises further compressing the down sampled data stream to the desired bit rate, the desired bit rate being based at least on allowing longer recording times.

11. An apparatus comprising:
a video decoder having an output to output a decoded data stream including decompressed video data, and having a digital input interface;
an encoder coupled to the video decoder to encode a decoded data stream received from the video decoder;
down sampling logic to dynamically adjust the aggressiveness of down sampling of the data stream, wherein down sampling is based at least on constraints imposed by storage resources; and
a non-volatile storage unit coupled to the video decoder.

12. The apparatus of claim 11 wherein the video decoder comprises:
an encryption engine; and
a decryption engine.

13. The apparatus of claim 11 wherein the encoder comprises:
a compression engine.

14. The apparatus of claim 13 wherein the compression engine performs motion picture experts group (MPEG) encoding.

15. The apparatus of claim 11 further comprising:
a local area network interface.

16. The apparatus of claim 11 further comprising:
a wireless network interface.

17. The apparatus of claim 11 further comprising:
a host processor coupled to the video decoder.

18. A system comprising:
a video decoder including an output to output a decoded data stream having decompressed video data, and including a down sampler wherein the aggressiveness of down sampling is dynamically adjusted, wherein down sampling is based at least on constraints imposed by storage resources;
an encoder coupled to the video decoder to encode a video stream at a bit rate below a bit rate of a source stream;
a wireless interface operably coupled to the video decoder to transmit the video stream at the bit rate below the bit rate of the source stream; and
a display to receive and display the video stream.

19. The system of claim 18 further comprising:
a non-volatile storage unit coupled to the video decoder.

20. The system of claim 18 further comprising:
a local interface operably coupled to the video decoder to transmit the source stream at a full bit rate; and
a display coupled to the local interface.

21. An apparatus comprising:
means for decoding an incoming video stream into a decoded video stream including decoded video data;
means for down sampling the decoded video stream wherein the aggressiveness of down sampling is dynamically adjusted, wherein down sampling is based at least on constraints imposed by storage resources; and
means for encoding the decoded video stream into a lower bit rate video stream.

22. The apparatus of claim 21 further comprising:
means for storing the lower bit rate video stream.

23. The apparatus of claim 21 further comprising:
means of selecting the lower bit rate based on a transmission medium to be used.

24. A computer readable storage media containing executable computer program instructions which when executed cause a digital processing system to perform a method comprising:
decoding a digital data stream received at a video decoder into data including decompressed video data;
dynamically adjusting the aggressiveness of down sampling of decoded data stream, wherein down sampling is based at least on constraints imposed by storage resources; and
encoding the decoded data stream at a bit rate below a bit rate of the digital data stream to form a lower bit rate data stream.

25. The computer readable storage media of claim 24 which when executed cause a digital processing system to perform a method further comprising:
down sampling the data stream prior to passing the decoded data stream.

26. The computer readable storage media of claim 24 which when executed cause a digital processing system to perform a method further comprising:
storing data corresponding to the lower bit rate data stream in a non-volatile storage medium.

27. The computer readable storage media of claim 24 which when executed cause a digital processing system to perform a method further comprising:
encrypting the lower bit rate data stream; and
busing the encrypted lower bit rate data stream to a distribution interface.

28. The computer readable storage media of claim 24 which when executed cause a digital processing system to perform a method further comprising:
sending the digital data stream to a display device if the display device is local to the video decoder; and
sending the lower bit rate data stream to a display device if the display device is remote from the video decoder.

29. The computer readable storage media of claim 24 which when executed cause a digital processing system to perform a method further comprising:
wirelessly transmitting the lower bit rate data stream to a display device.

30. The computer readable storage media of claim 24 which when executed cause a digital processing system to perform a method further comprising:
compressing the decoded data stream.

* * * * *